March 28, 1961 W. F. M. GRAY ET AL 2,977,556
ELECTRICAL COIL

Filed March 15, 1957 2 Sheets-Sheet 1

Inventors,
Willard F. M. Gray,
Rene O. Moser,
by Gilbert P. Tarleton
Their Attorney.

March 28, 1961 W. F. M. GRAY ET AL 2,977,556
ELECTRICAL COIL
Filed March 15, 1957 2 Sheets-Sheet 2

Inventors,
Willard F.M. Gray,
Rene O. Moser,
by Gilbert P. Tarleton
Their Attorney.

United States Patent Office 2,977,556
Patented Mar. 28, 1961

2,977,556

ELECTRICAL COIL

Willard F. M. Gray and Rene O. Moser, Pittsfield, Mass., assignors to General Electric Company, a corporation of New York Filed Mar. 15, 1957, Ser. No. 646,313

1 Claim. (Cl. 336—185)

The present invention relates to electrical coils or windings, and more particularly concerns foil-wound induction coils and a method of making them, wherein the coils incorporate ducts for circulation of cooling media and are adapted especially for comparatively large transformers and other electrical induction apparatus.

By the term "foil-wound induction coil" is meant a coil of given axial length formed by flatwise winding on itself a suitably insulated ribbon or strip of low specific electrical resistance material whose width is substantially equal to the axial length of the coil and whose thickness corresponds to that of the foil form of the material, i.e., no more than a few mils, so that each turn of the ribbon or strip constitutes one complete layer of the coil.

The use of foil windings for transformers, especially large commercial frequency power transformers, offers several advantages. A substantial reduction in the space occupied by the coils is afforded, and the magnetic core can also be made smaller, without sacrifice of the electrical capacity of the transformer. Furthermore, the foil configuration of the coil material facilitates winding and tap inserting procedures and lends itself more readily to mechanization of these operations as compared to the more conventional wire coil arrangements for transformers.

Further advantages are greater mechanical strength to resist internal electromagnetic forces resulting from short circuit currents, particularly short circuits between taps, and much more uniform inherent distribution of transient voltage stresses, such as lightning surges, throughout the winding as compared with conventional wire wound coils.

In continuously winding the primary and secondary coils of a foil-wound transformer, it is important that the turns of foil and insulation on the coil be smooth and wrinkle-free, in order to avoid irregularities in the coil winding which are susceptible to electrical breakdown during operation and which result in irregularly formed coils taking up excessive space. Difficulty in this regard is especially experienced in attempts to wind sheet material of large widths, such as 60 inches or more, in order to form large size foil-wound coils for power transformers and other high-rating induction apparatus. Such large sheets are particularly subject to wrinkling and other surface irregularities both in being handled before the winding procedure and in the course of winding. To overcome this difficulty, it has been found desirable to arrange a roller member in pressure contact with the sheets as they are laid on the coil winding.

However, due to the necessary provision of circumferentially spaced generally axially extending ducts at intervals through the radial build of the wound foil structure for the circulation of cooling and insulating fluid, the surface of the coil as it is being wound does not present a sufficiently smooth continuous base on which the pressure roller may ride, and as a result the foil and associated insulating sheets may be deformed, the winding will not have the desired smoothness and uniformity, and the winding apparatus will undergo a severe bumping effect which subjects it to undue wear and may cause damage to the sheets being wound.

Apart from the difficulties presented in attempting to wind large foil-wound induction coils as mentioned, it has not previously been considered feasible for other reasons to make large size transformers using foil conductors. Heretofore, it was throught that if the axial length of foil-wound coils was extended to large commercial frequency power transformer sizes, i.e., of the order of a man's height or greater, the current in the correspondingly wide low resistance foil material would not distribute itself evenly throughout the cross sections of the strip thus causing uneconomical use of the conductor material and excessive temperature differentials or local heating. It was further thought that eddy currents induced in the wide induction strip by leakage flux effects would accentuate these conditions.

Unexpectedly, however, actual tests of foil-wound coils of such sizes on conventional magnetic cores have shown that such adverse effects are not produced to any substantial extent and that temperature gradients throughout the coil are surprisingly low and uniform, both axially and radially.

It is an object of the present invention to provide improved induction coils formed of sheet material, especially foil-wound transformer coils, and a method of making the same.

It is another object of the invention to provide foil-wound electrical coils, especially for transformers of large size, wherein the foil-wound coil incorporates ducts for circulation of cooling and insulating media and wherein the layers of foil and associated insulation are smooth, wrinkle-free and tightly wound.

It is a further object of the invention to provide foil-wound coils incorporating duct-forming spacer members wherein a smooth, continuous base is provided for supporting pressure means used in forming the foil-wound coils, and to avoid intermittent jolting of the pressure means as it rides on the coil being wound.

It is still another object of the invention to provide a method of making foil-wound coils of the above type wherein the duct-forming spacers are placed and maintained in properly spaced positions during the winding process.

There is provided in accordance with the invention a foil-wound coil for electrical induction apparatus comprising concentric layers of insulated foil which is at least 30 inches wide, and as much as 60–90 inches in width, and including means between adjacent layers of the coil for forming ducts extending through the coil to provide for circulation of cooling media, the foil-wound coil being characterized by extremely tight, smooth, wrinkle-free layers and having high mechanical strength for resisting stresses such as may be produced by short circuit conditions in a high voltage transformer.

To produce a foil-wound coil of the above type, the invention provides a method of making a foil-wound coil incorporating cooling ducts which comprises winding the insulated foil sheet material into a coil while providing pressure on the sheet material as it is being wound so as to form tight, wrinkle-free layers thereof on the coil, and introducing duct-forming means into the coil as the sheet material is being wound while providing support in the coil for continuously sustaining the pressure being exerted on the sheet material.

In one of its embodiments the present method comprises winding a coil of insulated foil material, introducing during the winding process between the turns of the coil a plurality of juxtaposed permanent and auxiliary elongated members extending along the coil, and thereafter removing the auxiliary elongated members from the foil-wound element after it has been formed, thus leaving spaced cooling ducts extending through the foil-wound element. There is thereby provided by the above-described plurality of auxiliary and permanent members a firm continuous support on which the pressure means, forcing the sheet material against the coil, may ride smoothly.

The invention will be better understood from the following description taken in conjunction with the accompanying drawings in which.

Figure 1:
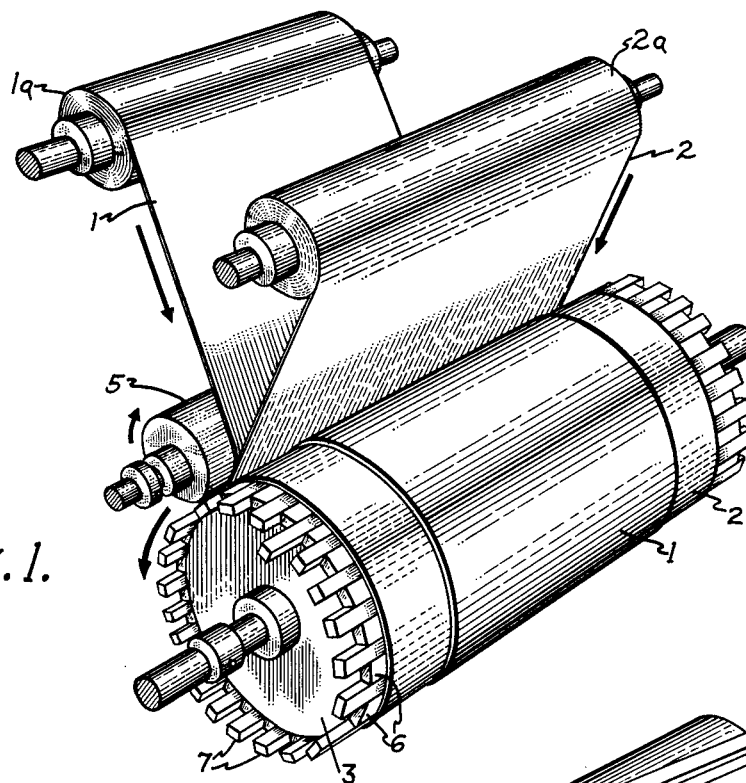
Fig. 1 is a perspective view of apparatus for winding coils of sheet material in accordance with the present invention.

Referring now to the drawings, and particularly to Fig. 1, there is shown a typical arrangement for winding a foil-wound transformer coil in accordance with the invention, wherein a sheet of metal foil 1, such as aluminum, from supply roll 1a is simultaneously wound with a sheet of insulation 2, such as kraft paper, from supply roll 2a concentrically around a suitable support, preferably an insulating cylinder 4 (see Figs. 2 and 3), mounted for rotation on mandrel 3. As shown, the insulating sheet 2 is generally wider than the metal foil sheet 1 so that the insulation layers interposed between adjacent foil turns extend substantially beyond the foil edges and thereby prevent arcing between the edges of different foil turns during the operation of the coil in a transformer.

The relative dimensions of the parts shown in the drawings are exaggerated for the purposes of clarity and are not intended to represent the actual scale of the components as used in practice. For large induction apparatus, such as power transformers to which the present invention is particularly applicable, the foil and insulation sheets 1, 2 would by way of example approximate 60 inches in width but may range from 30–90 inches in width. With such wide sheets, it has been found necessary to provide means such as roller 5 in pressure contact with the sheets as they are laid on the coil to keep them in a completely smooth and flat condition and to iron out any wrinkles which might be present thereon. In order, further, to provide the necessary tightness of the layers as they are wound so as to produce a finished coil having the least radial dimension, considerable tension (e.g., of the order of 6000 lbs./sq. inch) is placed on the foil being wound.

The thickness of the foil sheet 1 may vary from about ¼ mil to about 30 mils, the thinner foil being normally used for the high voltage coils and the thicker foil for the low voltage coils. The insulation (paper) sheet may have a thickness of from ¼ mil to about 6 mils per sheet, with one or more insulation sheets being used between each foil layer.

To provide ducts in the foil-wound structure for the passage of cooling media through the coil during operation of the transformer, the foil-wound coil 9 (see Fig. 4) preferably includes elongated spacers 6 arranged at intervals in the coil winding and suitably spaced to define channels 6' of desired size. If spacers 6 are merely arranged axially at intervals in the winding, contact roller 5 during the winding process would undergo a bumping action by intermittently striking the spacer bars 6 as it rides with substantial pressure against the periphery of the coil. The winding turns would, as a consequence, become deformed and there would be considerable risk of damage both to the insulation layers and foil layers which could ultimately lead to premature breakdown of the coil under operating conditions.

There would, furthermore, be an undesirable vibration transmitted to the winding apparatus leading to its improper operation and early failure.

To obviate these difficulties, there is provided in accordance wtih one embodiment of the invention a plurality of removable auxiliary strips 7 arranged in and substantially filling the duct spaces defined by the permanent spacer bars 6, as shown in Fig. 1, so as to provide a substantially smooth, continuous base on which the pressure roller 5 may ride during the winding process. Preferably, the radial dimension of auxiliary strips 7 is slightly smaller than that of the permanent spacers 6 in order to facilitate their removal from the completely wound structure. If desired, the auxiliary strips 7 may be waxed or otherwise suitably lubricated for this purpose. They are also preferably made of sufficient length to project from the edge of the coil, so that they can be more easily grasped for removal after completion of the winding. Both the permanent spacers 6 and auxiliary strips 7 may be of any desired material, either of insulating or metallic composition, and may, for example, consist of pressboard, wood, aluminum or other material.

Figure 2:
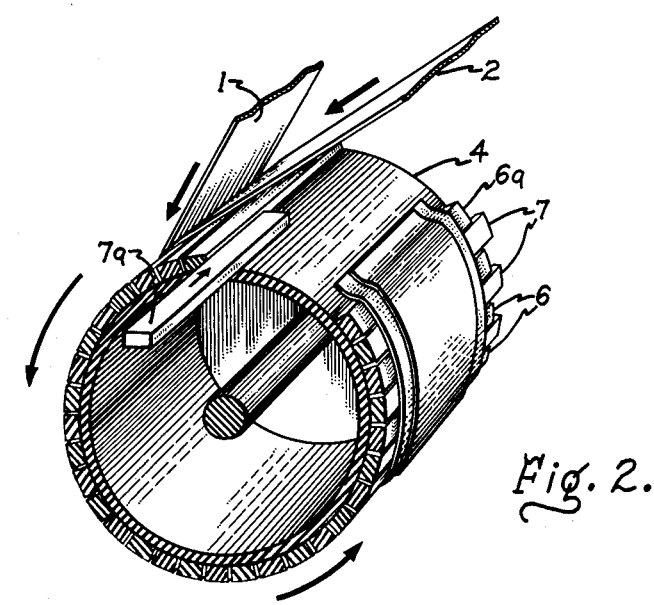
Fig. 2 illustrates one embodiment of the present winding method.

The duct-forming spacers 6 and the auxiliary filler strips 7 can be introduced in various ways into the coil during the winding procedure. Fig. 2 illustrates one method of inserting these members which may be carried out manually. In this process, the starting ends of the foil and insulation strips 1, 2 are securely attached by any suitable means to the surface of insulating cylinder 4, and as the winding of these strips around cylinder 4 proceeds, the operator inserts at the nip between the insulating sheet 2 and the underlying surface the permanent spacers 6 and auxiliary members 7 alternately in sequence. Auxiliary strip 7a as shown in Fig. 2 is just being inserted into place adjacent a previously positioned spacer bar at the winding stage illustrated. Usually, the permanent spacers 6 as well as the auxiliary members 7 are held sufficiently secure in the winding by the pressure of the overlying foil and insulating sheets, but if desired the permanent spacers 6 may be coated with a suitable adhesive to ensure their secure attachment to the winding turn on which they are placed, or in the winding stage shown in Fig. 2, on the cylinder 4.

In a usual construction in accordance with the invention, only one complete annular row of spacer ducts will be provided in the winding at a time, so that in the procedure illustrated in Fig. 2 permanent spacers 6 and auxiliary members 7 will be inserted only until the initial bar 6a of that series is reached after one revolution of mandrel 3. Thereafter, a number of turns of the foil and interposed insulating sheets will be wound on the coil before another series of spacer bars and filler strips is provided, as indicated in Fig. 4.

Figure 3:
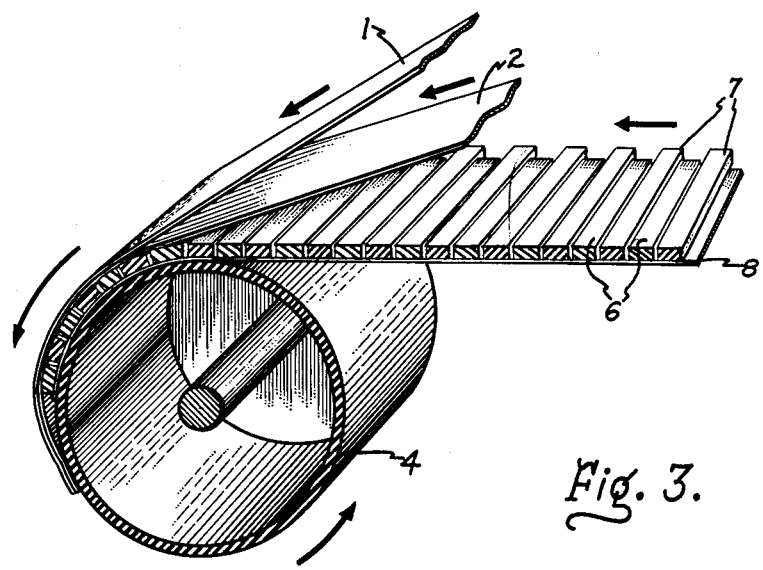
Fig. 3 illustrates another embodiment of the present winding method.

Fig. 3 shows a different method of inserting the spacer bars and filler strips. In this process, the permanent and auxiliary members 6, 7 are mounted on a carrier web 8 of paper or the like, bars 6 preferably being secured to the surface of the web by adhesive or other suitable means, while auxiliary strips 7 are merely laid freely in the spaces therebetween. The end of the web 8 is then inserted in any desired manner into the starting nip at the beginning of the wind and is continuously fed into the winding as cylinder 4 rotates. As will be understood, the length of the web will be equivalent to the circumference of the cylinder 4 (or the periphery of the underlying coil surface is subsequent duct formations) to provide the desired complete circumferential row of ducts.

Figure 4:
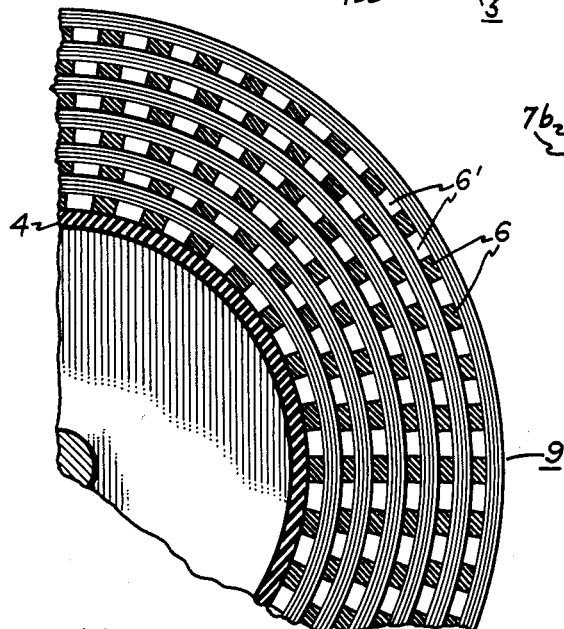
Fig. 4 is a fragmentary view in cross-section of a foil-wound coil element which may be formed in accordance with the present invention.

In both procedures described, after the winding of the coil is completed, the projecting auxiliary filler strips 7 are merely grasped at their ends and slid lengthwise out of the foil-wound structure, leaving a series of regularly spaced cooling ducts 6' between turns of a smooth, tight insulated foil winding, as shown in Fig. 4.

It is not necessary in all cases that the length of the auxiliary members 7 be as great as the coil width. If the coil is unusually wide, so that difficulty is encountered in removing a single long filler strip 7 from between the turns, it may be desirable to use two short auxiliary strips extending inwardly from opposite sides of the coil. Even if a gap should be left inside the coil between the inner ends of two such short filler strips, sufficient support for the contact roller 5 will be provided by the spaced strips to prevent it from jolting.

Although not shown, conducting taps of desired type may be attached to the foil in any suitable manner at different stages of the winding procedure.

It will be understood that in any duct series wherein the ducts extend substantially axial as shown in Figs. 2 and 3 the width of the spacer bars 6, the intervals at which they are spaced, and the width of the auxiliary strips 7 should be proportioned to substantially fill the entire space in the row involved. Since the periphery of the coil becomes larger as the winding progresses, it may be desirable to suitably modify the width of the bars, ducts and filler strips for the subsequent duct rows to ensure a continuous, firm, smooth supporting surface on which the pressure roller 5 may ride.

In a typical foil-wound coil the spacer bars 6 will have a radial dimension of about ⅛–½ inch, and the spacing between adjacent bars will vary from ¼ inch to 3 inches depending usually on the distance of the spacer row from the center of the coil.

The arrangement of the spacer bars 6 in the coil may differ from that shown in Fig. 4. In certain cases, for example, it is desirable to arrange the spacer bars in definite radial alignment rather than as shown, such radial alignment having been found to provide the coil with improved resistance to radial stresses which may be produced in the coil by short circuit conditions.

Figure 5:
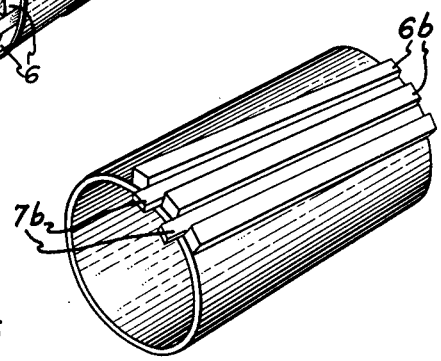
Fig. 5 shows a variation in the arrangement of spacer bars which may be used in practicing the invention.

Fig. 5 shows a different embodiment of the invention, wherein the permanent spacers 6b and the removable auxiliary strips 7b are arranged in the winding at an angle to the axis of the coil. With this arrangement, it will be evident that the angled spacers 6b themselves provide a continuous support for the pressure contact roller 5 described above, since the axis of the latter is normally parallel to the axis of the coil and the roller thus will always be supported by a plurality of spacer bars 6b. Since in this case strips 7b need not fill the entire depth of the duct space to provide an adequate support for the pressure roller, these auxiliary strips may be of lesser height than the adjoining spacer bars 6b to facilitate their removal from the wound coil. In this embodiment the strips 7b serve principally as spacer elements to properly align and maintain the permanent bars 6b in position during the winding process.

The foil-wound coils produced in accordance with the invention are characterized by wound turns of both the foil and insulation sheets which are entirely free of wrinkles, creases or other irregularities, which otherwise would contribute to poor electrical properties of the coil and lead to premature breakdown of the transformer. Moreover, the foil-wound coils of the present invention are very tightly wound and exteremely compact, and are characterized by an overbuild of about 1%. "Overbuild" as used herein is intended to mean the percent difference between the actual radial dimension of the wound coil and the sum of the radial dimensions of the superposed coil components. As will be evident, the tighter the coil is wound the lower will be its overbuild. Because of its tight and compact nature the present coil offers particularly good mechanical resistance to axial and radial stresses produced by short circuit conditions, and also has improved heat transfer properties.

There are thus provided by the invention foil-wound coils which are particularly suitable for use in high voltage transformers, and an economical and practical method of winding such coils while incorporating cooling ducts therein without deforming or otherwise damaging the coil components.

While the present invention has been described with reference to particular embodiments thereof, it will be understood that numerous modifications may be made by those skilled in the art without actually departing from the scope of the invention. Therefore, the appended claim is intended to cover all such equivalent variations as come within the true spirit and scope of the invention.

What we claim as new and desire to secure by Letters Patent of the United States is:

A foil-wound transformer coil comprising concentric layers of insulated foil means at least 30 inches wide, elongated spacer members extending at an angle to the axis of the coil forming a plurality of radially spaced annular rows of ducts extending through said coil between certain layers thereof, said rows being separated by a plurality of turns of said insulated foil means, the coil having tight, wrinkle-free layers and an overbuild not substantially more than 1%.

References Cited in the file of this patent

UNITED STATES PATENTS

| | | |
|---|---|---|
| 1,641,272 | Horelick | Sept. 6, 1927 |
| 2,344,334 | Vienneau | Mar. 14, 1944 |
| 2,467,804 | Beymer | Apr. 19, 1949 |
| 2,521,513 | Gray | Sept. 5, 1950 |
| 2,550,592 | Pearce | Apr. 24, 1951 |
| 2,622,135 | Olivier | Dec. 16, 1952 |
| 2,696,659 | McCarty | Dec. 14, 1954 |
| 2,743,508 | Isaacson | May 1, 1956 |